United States Patent
Haque et al.

(10) Patent No.: US 10,219,006 B2
(45) Date of Patent: Feb. 26, 2019

(54) JCTVC-L0226: VPS AND VPS_EXTENSION UPDATES

(71) Applicant: SONY CORPORATION, Tokyo (JP)

(72) Inventors: Munsi Haque, San Jose, CA (US); Ali Tabatabai, Cupertino, CA (US)

(73) Assignee: SONY CORPORATION, Tokyo (JP)

( * ) Notice: Subject to any disclaimer, the term of this patent is extended or adjusted under 35 U.S.C. 154(b) by 587 days.

(21) Appl. No.: 14/035,711

(22) Filed: Sep. 24, 2013

(65) Prior Publication Data
US 2014/0192858 A1   Jul. 10, 2014

Related U.S. Application Data

(60) Provisional application No. 61/748,893, filed on Jan. 4, 2013.

(51) Int. Cl.
*H04N 19/70* (2014.01)
*H04N 19/597* (2014.01)
*H04N 19/34* (2014.01)

(52) U.S. Cl.
CPC .......... *H04N 19/70* (2014.11); *H04N 19/597* (2014.11); *H04N 19/34* (2014.11)

(58) Field of Classification Search
CPC .......... H04N 19/597; H04N 19/00884; H04N 19/70; H04N 19/34
See application file for complete search history.

(56) References Cited

U.S. PATENT DOCUMENTS

| | | | |
|---|---|---|---|
| 5,956,026 A | 9/1999 | Ratakonda | |
| 8,938,004 B2 | 1/2015 | Boyce et al. | |
| 2008/0310500 A1* | 12/2008 | Winger | H04N 21/235 375/240.01 |
| 2009/0279612 A1* | 11/2009 | Pandit | H04N 19/597 375/240.25 |
| 2010/0254458 A1* | 10/2010 | Amon | H04N 21/234327 375/240.13 |
| 2011/0286530 A1 | 11/2011 | Tian et al. | |
| 2012/0075436 A1* | 3/2012 | Chen | H04N 19/597 348/51 |
| 2012/0163452 A1* | 6/2012 | Horowitz | H04N 19/137 375/240.12 |
| 2012/0207227 A1* | 8/2012 | Tsai | H04N 19/136 375/240.29 |

(Continued)

FOREIGN PATENT DOCUMENTS

| | | |
|---|---|---|
| CN | 1960492 A | 5/2007 |
| CN | 101485208 A | 7/2009 |
| EP | 0684719 A1 | 11/1995 |

OTHER PUBLICATIONS

Gary J. Sullivan, Overview of the High Efficiency Video Coding (HEVC) Standard, IEEE transactions on Circuits and System for Video Technology,Dec. 2012, pp. 1649-1668, Vo., 22, No. 12.

(Continued)

*Primary Examiner* — Neil R Mikeska
(74) *Attorney, Agent, or Firm* — Chip Law Group (57) ABSTRACT

The VPS and vps_extension( ) syntax structures are updated with some cleanups for the HEVC Extensions in scalable video coding, multi-view coding and 3D video coding areas. In addition, four options of adding syntaxes to support mixed video sequences in various layers for the VPS extension are described.

8 Claims, 4 Drawing Sheets

(56) References Cited

U.S. PATENT DOCUMENTS

| | | | |
|---|---|---|---|
| 2012/0229602 A1* | 9/2012 | Chen | H04N 19/597 348/43 |
| 2012/0230431 A1* | 9/2012 | Boyce | H04N 19/30 375/240.25 |
| 2012/0275517 A1 | 11/2012 | Boyce et al. | |
| 2013/0089134 A1 | 4/2013 | Wang et al. | |
| 2013/0107942 A1 | 5/2013 | Chen et al. | |
| 2013/0114694 A1* | 5/2013 | Chen | H04N 19/463 375/240.03 |
| 2013/0182755 A1 | 7/2013 | Chen | |
| 2013/0266077 A1 | 10/2013 | Boyce | |
| 2013/0279564 A1 | 10/2013 | Wang | |
| 2013/0287115 A1 | 10/2013 | Wang | |
| 2013/0294499 A1 | 11/2013 | Wang | |
| 2013/0294500 A1 | 11/2013 | Wang | |
| 2013/0343465 A1 | 12/2013 | Chen | |
| 2014/0003491 A1 | 1/2014 | Chen | |
| 2014/0003492 A1 | 1/2014 | Chen | |
| 2014/0078249 A1 | 3/2014 | Wang | |
| 2014/0086303 A1 | 3/2014 | Wang | |
| 2014/0086333 A1 | 3/2014 | Wang | |
| 2014/0086334 A1 | 3/2014 | Haque | |
| 2014/0092996 A1 | 4/2014 | Wang | |
| 2014/0140398 A1* | 5/2014 | Deshpande | H04N 19/46 375/240.12 |
| 2014/0140414 A1* | 5/2014 | Deshpande | H04N 19/597 375/240.25 |
| 2014/0181885 A1 | 6/2014 | Rusert | |
| 2014/0192858 A1 | 7/2014 | Haque et al. | |
| 2014/0192859 A1 | 7/2014 | Haque et al. | |
| 2014/0294063 A1 | 10/2014 | Chen | |
| 2014/0301451 A1 | 10/2014 | Deshpande | |
| 2015/0245046 A1 | 8/2015 | Tsukuba | |

OTHER PUBLICATIONS

Miska M. Hannuksela, et al.,"VPS Extension Design", Joint Collaborative Team Video Coding (JCT-VC) of ITU-T, SF 16WP 3 and ISO/IEC JTC 1/SC 29/WG 11, 11th Meeting: Shanghai, CN, Oct. 10-19, 2012, pp: 1-8 Document JCTV-K0274.

Jill Boyce,"NAL Unit Header and Parameter Set Designs for HEVC Extensions", Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, pp. 1-8, Document JCTV-K1007.

Jill Boyce,"VPS Syntax for Scalable and 3D Extensions", VIDYO Person Telepresence, Document, JCTVC-K0204, pp. 1-14.

Munsi Haque,"On Support of Mixed Video Sequences in High Level Syntaxes", Joint Collaborative Team on Video Coding (JCT-VC) of ITU-T SG 16 WP 3 and ISO/IEC JTC 1/SC 29/WG 11, 11th Meeting: Shanghai, CN, Oct. 9-19, 2012, pp. 1-7, Document JCTV-K0232, WG11 No. m26564.

Benjamin Bross,"High Efficiency Video Coding (HEVC) Test Specification Draft 9", Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, pp. 1-317, Document JCTV-K1003.

Office Action received for Japanese Patent application No. 2015-551694, dated Jun. 28, 2016, 4 pages of office action.

Munsi Haque, "On support of mixed video sequences in High Level Syntaxes", Joint Collaborative Team on Video Coding (JCT-VC) of ITU-T SG16 WP3 and ISO/IEC JTC1/SC29/WG11, 11th Meeting: Shanghai China, Oct. 9-19, 2012, pp. 8.

European Extended Search Report Received for European Patent Application No. 13870154.5, dated Jun. 30, 2016, p. 9.

Munsi Haque et al., "On Support of Mixed Video Sequences in High Level Syntaxes", Joint Collaborative Team on Video Coding (JCT-VC) of ITU-T SG 16 WP 3 and ISO/IEC JTC 1/SC 29/WG 11, 11th Meeting: Shanghai, China, Oct. 9-19, 2012, pp. 7.

Jill Boyce et al., "NAL Unit Header and Parameter Set Designs for HEVC Extensions", Joint Collaborative Team on Video Coding (JCT-VC) of ITU-T SG 16 WP 3 and ISO/IEC JTC 1/ISC 29/WG 11, 11th Meeting: Shanghai, CN, Oct. 10-19, 2012, pp. 8.

Munsi Haque, "Vps and Vps_Extension Updates", Joint Collaborative Team on Video Coding (JCT-VC) of ITU-T SG 16 WP 3 and ISO/IEC JTC I/SC 29/WG 11, 12th Meeting: Geneva, CH, Jan. 14-23, 2013, p. 7.

Office Action Received for Korean Patent Application No. 10-2015-7017652, dated Jul. 8, 2016, 9 Pages of Office Action Including 4 Pages of English Translation.

Benjamin Bross et al., "High Efficiency Video Coding (HEVC) text specification draft 9", Joint Collaborative Team on Video Coding (JCT-VC) of ITU-T SG16 WP3 and ISO/IEC JTC1/SC29/WG11, 11th Meeting: Shanghai, CN, Oct. 10-19, 2012, pp. 318.

Search Report and Written Opinion of SG Application No. 11201505267S, dated Sep. 16, 2016, pp. 09.

Boyce, et al., "NAL unit header and parameter set designs for HEVC extensions", Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, pp. 08.

Ye-Kui Wang, "Solutions considered for NAL unit header and video parameter set for HEVC extensions", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, pp. 06.

Skupin, et al., "Video Parameter Set extension design", Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, pp. 04.

Haque, et al., "On Support of Mixed Video Sequences in High Level Syntaxes", Joint Collaborative Team on Video Coding (JCT-VC) of ITU-T SG 16 WP 3 and ISO/IEC JTC 1/SC 29/WG 11, 11th Meeting: Shanghai, China, Oct. 9-19, 2012, pp. 07.

Sachin Deshpande, "On Video Parameter Set", Joint Collaborative Team on Video Coding (JCT-VC) of ITU-T SG16 WP3 and ISO/IEC JTC1/SC29/WG11, 11th Meeting: Shanghai, CN, Oct. 10-19, 2012, pp. 08.

Office Action for KR Patent Application No. 10-2015-7017652, dated Nov. 21, 2016, 4 pages of Office Action and 3 pages of English Translation.

Bross, et al., "High Efficiency Video Coding (HEVC) text specification draft 9" JCTVC-K1003, JCT-VC of ITU-T SG 16 WP 3 and ISO/IEC JTC 1/SC 29/WG11, 11th Meeting: Shanghai, CN, Oct. 21, 2012, 318 pages.

Haque, et al., "On support of mixed video sequences in High Level Syntaxes", JCTVC-K0232, JCT-VC of ITU-T SG 16 WP 3 and ISO/IEC JTC 1/SC 29/WG11, 11th Meeting: Shanghai, CN, Oct. 5, 2012, 7 pages.

Office Action for CN Patent Application No. 201380069400.1, dated Dec. 28, 2016, 12 pages of Office Action and 20 pages of English Translation.

Office Action for KR Patent Application No. 10-2017-7016593, dated Jul. 19, 2017, 09 pages.

Office Action for CN Patent Application No. 201380069400.1, dated Aug. 28, 2017, 08 pages of Office Action and 12 pages of English Translation.

Boyce, et al., "NAL unit header and parameter set designs for HEVC extensions", JCTVC-K1007, Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, pp. 08.

Bross, et al., "High Efficiency Video Coding (HEVC) text specification draft 9" JCTVC-K1003_v13, Joint Collaborative Team on Video Coding (JCT-VC) of ITU-T SG 16 WP 3 and ISO/IEC JTC 1/SC 29/WG11, 11th Meeting: Shanghai, CN, Oct. 10-19, 2012, 318 pages.

Office Action for KR Patent Application No. 10-2017-7037117, dated Dec. 6, 2018, 04 pages of Office Action and 03 pages of English Translation.

Boyce, et al., "NAL Unit Header and Parameter Set Designs for HEVC Extensions", Joint Collaborative Team on Video Coding (56) References Cited

OTHER PUBLICATIONS (JCT-VC) of ITU-T SG 16 WP 3 and ISO/IEC JTC 1/SC 29/WG 11, 11th Meeting, Shanghai, JCTVC-K1007, Oct. 10-19, 2012, 08 pages.
BROSS, et al., "High Efficiency Video Coding (HEVC) Text Specification Draft 9", Joint Collaborative Team on Video Coding (JCT-VC)of ITU-T SG16 WP3 and ISO/IEC JTC1/SC29/WG11, 11th Meeting, Shanghai, JCTVC-K1003 v12, Oct. 10-19, 2012, 321 pages.

* cited by examiner

JCTVC-L0226: VPS AND VPS_EXTENSION UPDATES

CROSS-REFERENCE TO RELATED APPLICATION(S)

This application claims priority under 35 U.S.C. § 119(e) of the U.S. Provisional Patent Application Ser. No. 61/748,893, filed Jan. 4, 2013 and titled, "JCTVC-L0XXX: VPS AND VPS_EXTENSION UPDATES," which is hereby incorporated by reference in its entirety for all purposes.

FIELD OF THE INVENTION

The present invention relates to the field of video encoding. More specifically, the present invention relates to high efficiency video coding.

BACKGROUND OF THE INVENTION

The Video Parameter Set (VPS) has been added as metadata to describe the overall characteristics of coded video sequences, including the dependencies between temporal sublayers. The primary purpose of this is to enable the compatible extensibility of the standard in terms of signaling at the systems layer, e.g., when the base layer of a future extended scalable or multiview bitstream would need to be decodable by a legacy decoder, but for which additional information about the bitstream structure that is only relevant for the advanced decoder would be ignored.

SUMMARY OF THE INVENTION

The VPS and vps_extension( ) syntax structures are updated with some cleanups for the HEVC Extensions in scalable video coding, multi-view coding and 3D video coding areas. In addition, four options of adding syntaxes to support mixed video sequences in various layers for the VPS extension are described.

In one aspect, a method programmed in a non-transitory memory of a device comprises decoding content and accessing information related to the content, wherein the information comprises video parameter set data, further wherein the video parameter set data comprises mixed signaling information. A video parameter set function used in determining the video parameter set data is under a condition of a video parameter set extension flag. Byte-alignment syntaxes used in determining the video parameter set data are under a condition of a video parameter set extension flag. The video parameter set data includes a raw byte sequence payload trailing bits value. The video parameter set data is determined without using byte alignment syntaxes. The video parameter set data is determined using two syntaxes for mixed sequence signaling support. The video parameter set data is determined using a source mixed codec flag syntax parameter. The video parameter set data is determined using a source mixed video present flag syntax parameter. The video parameter set data is determined using specific application support and a source mixed video present flag syntax parameter. The method further comprises encoding the content. The device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a high definition disc writer/player, an ultra high definition disc writer/player), a television, a home entertainment system, or a smart watch.

In another aspect, a method programmed in a non-transitory memory of a device comprises providing content and enabling access of information related to the content, wherein the information comprises video parameter set data, further wherein the video parameter set data comprises mixed signaling information. A video parameter set function used in determining the video parameter set data is under a condition of a video parameter set extension flag. Byte-alignment syntaxes used in determining the video parameter set data are under a condition of a video parameter set extension flag. The video parameter set data includes a raw byte sequence payload trailing bits value. The video parameter set data is determined without using byte alignment syntaxes. The video parameter set data is determined using two syntaxes for mixed sequence signaling support. The video parameter set data is determined using a source mixed codec flag syntax parameter. The video parameter set data is determined using a source mixed video present flag syntax parameter. The video parameter set data is determined using specific application support and a source mixed video present flag syntax parameter. The method further comprises encoding the content. The device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a high definition disc writer/player, an ultra high definition disc writer/player), a television, a home entertainment system, or a smart watch.

In another aspect, an apparatus comprises a non-transitory memory for storing an application, the application for decoding content and accessing information related to the content, wherein the information comprises video parameter set data, further wherein the video parameter set data comprises mixed signaling information and a processing component coupled to the memory, the processing component configured for processing the application. A video parameter set function used in determining the video parameter set data is under a condition of a video parameter set extension flag. Byte-alignment syntaxes used in determining the video parameter set data are under a condition of a video parameter set extension flag. The video parameter set data includes a raw byte sequence payload trailing bits value. The video parameter set data is determined without using byte alignment syntaxes. The video parameter set data is determined using two syntaxes for mixed sequence signaling support. The video parameter set data is determined using a source mixed codec flag syntax parameter. The video parameter set data is determined using a source mixed video present flag syntax parameter. The video parameter set data is determined using specific application support and a source mixed video present flag syntax parameter. The apparatus further comprises encoding the content.

DETAILED DESCRIPTION OF THE PREFERRED EMBODIMENT

The Video Parameter Set (VPS) syntax structure in the current Draft International Standard (DIS) specification for High Efficiency Video Coding (HEVC) is shown below.

| video_parameter_set_rbsp( ) { | Descriptor |
|---|---|
| vps_video_parameter_set_id | u(4) |
| vps_reserved_three_2bits | u(2) |
| vps_reserved_zero_6bits | u(6) |
| vps_max_sub_layers_minus1 | u(3) |
| vps_temporal_id_nesting_flag | u(1) |
| vps_reserved_0xffff_16bits | u(16) |
| profile_tier_level(1, vps_max_sub_layers_minus1) | |
| bit_rate_pic_rate_info( 0, vps_max_sub_layers_minus1) | |
| vps_sub_layer_ordering_info_present_flag | u(1) |
| for (i= (vps_sub_layer_ordering_info_present_flag ? 0: vps_max_sub_layers_minus1); i <= vps_max_sub_layers_minus1; i++) { | |
| vps_max_dec_pic_buffering[i] | ue(v) |
| vps_max_num_reorder_pics[i] | ue(v) |
| vps_max_latency_increase[i] | ue(v) |
| } | |
| vps_max_nuh_reserved_zero_layer_id | u(6) |
| vps_num_op_sets_minus1 | |
| for(i=1;i<vps_num_op_sets_minus1;i++) | |
| operation_point_set(i) | |
| vps_num_hrd_parameters | ue(v) |
| for(i=0;i<num_hrd_parameters;i++) { | |
| hrd_op_set_idx[i] | ue(v) |
| if(i>0) | |
| cprms_present_flag[i] | u(1) |
| hrd_parameters(cprms_present_flag[i], vps_max_sub_layers_minus1) | |
| } | |
| vps_extension_flag | u(1) |
| if(vps_extension_flag) | |
| while(more_rbsp_data( )) | |
| vps_extension_data_flag | u(1) |
| rbsp_trailing_bits( ) | |
| } | |

The if(vps_extension_flag) section above is updated below to support various HEVC extensions.

| video_parameter_set_rbsp( ) { | Descriptor |
|---|---|
| vps_video_parameter_set_id | u(4) |
| vps_reserved_three_2bits | u(2) |
| vps_max_layers_minus1 //vps_reserved_zero_6bits in version-1 | u(6) |
| vps_max_sub_layers_minus1 | u(3) |
| vps_temporal_id_nesting_flag | u(1) |
| next_essential_info_byte_offset // vps_reserved_0xffff_16bits in version-1 | u(16) |
| profile_tier_level(1, vps_max_sub_layers_minus1) | |
| bit_rate_pic_rate_info( 0, vps_max_sub_layers_minus1) | |
| vps_sub_layer_ordering_info_present_flag | u(1) |
| for (i= (vps_sub_layer_ordering_info_present_flag ? 0 : vps_max_sub_layers_minus1); i <= vps_max_sub_layers_minus1; i++) { | |
| vps_max_dec_pic_buffering[i] | ue(v) |
| vps_max_num_reorder_pics[i] | ue(v) |
| vps_max_latency_increase[i] | ue(v) |
| } | |
| vps_max_nuh_reserved_zero_layer_id | u(6) |
| vps_num_op_sets_minus1 | |
| for(i=1;i<vps_num_op_sets_minus1;i++) | |
| operation_point_set(i) | |
| vps_num_hrd_parameters | ue(v) |
| for(i=0;i<num_hrd_parameters;i++) { | |
| hrd_op_set_idx[i] | ue(v) |
| if(i>0) | |
| cprms_present_flag[i] | u(1) |
| hrd_parameters(cprms_present_flag[i], vps_max_sub_layers_minus1) | |
| } | |
| vps_extension_flag /bit_equal_to_one in JCTVC-K1007_v1 | u(1) |
| if(vps_extension_flag) { | |
| while(!byte_aligned( )) | |
| vps_extension_byte_alignment_reserved_one_bit | u(1) |
| vps_extension( ) | |
| } | |
| rbsp_trailing_bits( ) | |
| } | |

The updates include:

1) The vps_reserved_zero_6 bits in version 1 is changed to vps_max_num_layers_minus1. However, in the vps_extension( ) syntax structure, this parameter is used as vps_max_layers_minus1. This is also consistent with a similar parameter vps_max_sub_layers_minus1 in version-1. Thus, vps_max_layers_minus1 is used in VPS.

2) For HEVC extensions, the "vps_extension( )" syntax structure as defined previously is inserted in VPS under the condition of vps_extension_flag.

3) The vps_reserved_0xffff_16 bits in version-1 is replaced by next_essential_info_byte_offset. This new syntax parameter is able to be used to locate the essential information available in "vps_extension( )" syntax structure.

4) The syntax parameter next_essential_info_byte_offset also includes the byte-alignment related syntaxes near the top of the "vps_extension( )" syntax structure. These byte-alignment syntaxes are taken out and placed inside the VPS under the condition of vps_extension_flag, just before the "vps_syntax( )" structure, for cleanliness.

5) The "rbsp_trailing_bits" contain a number of byte alignment bits for the VPS_rbsp( ), and such bit-counts are able to be determined as follows: nByteAlignmentBits= ((vps_extension_length+7)/8)*8−vps_extension length, where vps_extension_length is the total number of bits in vps_extension( ), and these are able to be computed easily as vps_extension( ) syntax structure so far contains fixed-length unsigned integer bits.

| vps_extension( ) { | Descriptor |
|---|---|
| for(i=1;i<vps_max_layers_minus1;i++) { | |
|     profile_tier_level(1,vps_max_sub_layers_minus1) | |
| for(i=1;i<vps_max_layers_minus1;i++) { | |
|     //layer dependency | |
|     num_direct_ref_layers[i] | u(6) |
|     for(j=0; j<num_direct_ref_layers[i];j++) | |
|         ref_layer_id[i][j] | u(6) |
| } | |
| } | |

While reviewing the above syntax structure and semantics description, a number of issues are discussed below as cleanups or for editing purposes.

For the scalability_mask syntax parameter, the following parameter table is listed, while the corresponding entries show the bit-location for the register-type data of "scalability_mask," but it is not described well.

| Scalability_mask | Scalability dimension |
|---|---|
| 0 | none (base HEVC) |
| 1 | spatial |
| 2 | quality |
| 3 | depth |
| 4 | multiview |
| 5 | unspecified |
| 6-15 | Reserved |

In place of the above table for scalability_mask, the following register-type description is better for a clearer understanding:

| 5 | 4 | 3 | 2 | 1 | 0 | Bit-positions |
|---|---|---|---|---|---|---|
| unspecified | multi-view | depth | quality | spatial | none | scalability dimension |
| 15 | 14 | 13 | 12 | 11 | 10 | 9 | 8 | 7 | 6 | reserved

The syntax structure of vps_extension( ) is shown below:

| vps_extension( ) { | Descriptor |
|---|---|
| while(!byte_aligned( )) | |
|     vps_extension_byte_alignment_reserved_one_bit | u(1) |
| avc_base_codec_flag | u(1) |
| scalability_mask | u(16) |
| for(i=0;i<NumScalabilityTypes;i++) { | |
|     dimension_id_len_minus1[i] | u(3) |
| } | |
| vps_nuh_layer_id_present_flag | u(1) |
| //layer specific information | |
| for (i=1; i<=vps_max_layers_minus1; i++) { | |
|     //mapping of layer ID to scalability dimension Ids | |
|     if (vps_nuh_layer_id_present_flag) | |
|         layer_id_in_nuh[i] | u(6) |
|     num_dimensions_minus1[i] | u(4) |
|     for (j=0; j<=num_dimensions_minus1; j++) { | |
|         dimension_type[i][j] | u(4) |
|         dimension_id[i][j] | u(v8) |
|     } | |
| } | |
| } | |

Also, the modified syntax structure of vps_extension( ) shown below, indicates some helpful cleanups.

| vps_extension( ) { | Descriptor |
|---|---|
| avc_base_codec_flag | u(1) |
| scalability_mask | u(16) |
| for(i=0;i<NumScalabilityTypes;i++) { | |
|     dimension_id_len_minus1[i] | u(3) |
| } | |
| vps_nuh_layer_id_present_flag | u(1) |
| //layer specific information | |
| for (i=0; i<=vps_max_layers_minus1; i++) { | |
|     //mapping of layer ID to scalability dimension IDs | |
|     if (vps_nuh_layer_id_present_flag) | |
|         layer_id_in_nuh[i] | u(6) |
|     for (j=0; j<=NumScalabilityTypes; j++) { | |
|         v = dimension_id_len_minus1[j]+1 | |
|         dimension_id[i][j] | u(v) |
|     } | |
| } | |
| } | |

| | Descriptor |
|---|---|
| vps_extension( ) { | |
|     for(i=1;i<vps_max_layers_minus1;i++) | |
|         profile_tier_level(1,vps_max_sub_layers_minus1) | |
|     for(i=0;i<vps_max_layers_minus1;i++) { | |
|       //layer dependency | |
|       num_direct_ref_layers[i] | u(6) |
|       for(j=0; j <num_direct_ref_layers[i];j++) | |
|         ref_layer_id[i][j] | u(6) |
|     } | |
| } | |

1) The byte-alignments-related syntaxes are removed.
2) The undefined parameter "num_dimensions_minus1" is replaced by NumScalabilityTypes."
3) Two of the "for" loops have been modified to start from 0 instead of 1. As an example, for "layer specific info," the "for(i=1; i<=vps_max_layers_minus1; i++){ . . . }" loop, if a coded video sequence containing stereo-view with depth-view (2+1=3 layers), there are 3 layers. So, vps_max_layers_minus1=3−1=2. If the current "for" loop is followed, $i=1=>$Layer-1=depth-view;

$i=2(vps\_max\_layers\_minus1)=>$Layer-2=View-1 where is $i=3=>$Layer-3=View-2?
As a correction, this loop is "for(i=0; i<=vps_max_layers_minus1; i++){ . . . }" for two cases, except for the "profile tier level( . . . )."
4) The semantics description for the syntax parameter "dimension_id[i][j]" is also not available with respect to "scalability dimension" and "dimension_id_len_minus1[j]." An exemplary table is shown below to show the relationship among these parameters:

| Scalability dimension | dimension_id | dimension_id_len(example) |
|---|---|---|
| none(base HEVC) | — | — |
| spatial | dependency_id | 4 |
| quality | quality_id | 4 |
| depth | depth_flag | 1 |
| multiview | view_idx | 4 |
| unspecified | — | — |
| Reserved | — | — |

The VPS and vps_extension( ) syntax structures are updated for the HEVC Extensions in scalable video coding, multi-view coding and 3D video coding areas.

VPS contains metadata to describe the overall characteristics of coded video, enables standards extension compatibility in terms of systems layer signaling so that a legacy decoder is able to ignore additional information about the extension bitstream structure. The current VPS syntax structure and its extension contain information for multi-layered video sequences, where a layer is able to be a base layer (for HEVC and its extensions), or is able to be a scalable enhancement layer (spatial or quality) for SHVC, or a view layer (texture view or depth view) for multi-view coding of HEVC extension (MHVC). All such layers are able to have their sublayers also (temporal). Each video layer is able to be depending upon its neighboring lower layers or it is able to be independent with no inter-layer predictions.

The motivation behind "mixed sequences signaling support" is to develop new layer-specific properties in the VPS extension syntax structure, as suggested in "JCTVC-K_notes." The layered syntax agreement for independent layers in VPS are able to be suitably exploited to support a variety of mixed contents (source-types, coding types and others) in the high level syntax structure for HEVC extensions.

Some possible application examples in mixed broadcasting or network transitions for a VPS with 2-layers are:

Frame structured video in layer-1 and field structured video in layer-2: each video layer has its respective SPS and more. Legacy mon-view (2-D) decoders are able to user either of these 2 layers for its base-layer application.

Frame structured video (2-D, mon-view) in layer-1 and frame-compatible (frame-packing) video (3D, stereo-view) in layer-2: legacy mono-view (2-D) decoder uses the layer-1 video, while an advanced stereo-view (3D) frame-compatible video decoder is able to use layer-2 for 3D stereo-view video application.

The combination of mixed video types will be present in the video bitstreams to support two such decoders (legacy and advanced).

Many such combinations of coded video content with varied source-types and coding types are able to co-exist in the current and future applications where either legacy or advanced decoders will sort out the respective bitstream for decoding.

The inherent layer-based descriptions of VPS are able to be extended to support such applications, at least for the systems level solutions (ad-insertions, splicing and more).

There are four possible options of adding syntax for mixed sequences signaling in VPS extension.

Option 1: 2 syntaxes for mixed sequences signaling support

Option 2: Option 1 plus source_mixed_codec_flag syntax parameter

Option 3: Option 2 plus mixed_video_present_flag syntax parameter

Option 4: specific applications support plus mixed_video_present_flag syntax parameter and use it as a condition for added syntax/semantics for this option.

Option 1

| | Descriptor |
|---|---|
| vps_extension( ) { | |
|   avc_base_codec_flag | u(1) |
|   source_mixed_video_type | u(4) |
|   scalability_mask | u(16) |
|   for(i=0;i<NumScalabilityTypes;i++) { | |
|     dimension_id_len_minus1[i] | u(3) |
|   } | |
|   vps_nuh_layer_id_present_flag | u(1) |
| //layer specific information | |
|   for (i=0; i<=vps_max_layers_minus1; i++) { | |
|     //mapping of layer ID to scalability dimension IDs | |
|     if (vps_nuh_layer_id_present_flag) | |
|       layer_id_in_nuh[i] | u(6) |
|     for (j=0; j<=NumScalabilityTypes; j++) { | |
|       v = dimension_id_len_minus1[j]+1 | |
|       dimension_id[i][j] | u(v) |
|     } | |
|     if(source_mixed_video_type > 0) | |
|       source_mixed_video_idc[i] | u(4) |
| } | |
|   for(i=0;i<vps_max_layers_minus1;i++) | |
|     profile_tier_level(1,vps_max_sub_layers_minus1) | |
|   for(i=0;i<vps_max_layers_minus1;i++) { | |
|     //layer dependency | |

-continued

| vps_extension( ) { | Descriptor |
|---|---|
| num_direct_ref_layers [i] | u(6) |
| for(j=0; j<num_direct_ref_layers[i];j++) | |
| ref_layer_id[i][j] | u(6) |
| } | |
| } | |

The semantics description for these two added syntax parameters are shown in the tables below:

| source_mixed_video_type | Mixed video combination sources (1st/2nd/3rd . . . ) |
|---|---|
| 0 | None |
| 1 | Frame/Field |
| 2 | Frame/Frame-Compatible |
| 3 | Field/Frame-Compatible |
| 4 | Frame-Compatible/Stereo-view |
| 5 | Frame/Field/Frame-Compatible |
| 6 | Frame/Frame-Compatible/Stereo-view |
| 7 . . . 15 | Undefined |

| source_mixed_video_idc | Mixed video combination order |
|---|---|
| 0 | First source-video-type present in Layer-i |
| 1 | Second source-video-type present in Layer-i |
| 2 | A mixture of First and Second source-video-types present in Layer-i |
| 3 | Third source-video-type present in Layer-i |
| 4 | A mixture of First, Second and Third source-video-types present in Layer-i |
| 5 . . . 15 | Undefined |

Option 2

| vps_extension( ) { | Descriptor |
|---|---|
| avc_base_codec_flag | u(1) |
| source_mixed_video_type | u(4) |
| scalability_mask | u(16) |
| for(i=0;i<NumScalabilityTypes;i++) { | |
| dimension_id_len_minus1[i] | u(3) |
| } | |
| vps_nuh_layer_id_present_flag | u(1) |
| //layer specific information | |
| for (i=0; i<=vps_max_layers_minus1; i++) { | |
| //mapping of layer ID to scalability dimension IDs | |
| if (vps_nuh_layer_id_present_flag) | |
| layer_id_in_nuh[i] | u(6) |
| for (j=0; j<=NumScalabilityTypes; j++) { | |
| v = dimension_id_len_minus1[j]+1 | |
| dimension_id[i][j] | u(v) |
| } | |
| if(source_mixed_video_type > 0) { | |
| source_mixed_video_idc[i] | u(4) |
| source_mixed_codec_flag[i] | u(1) |
| } | |
| } | |
| for(i=0;i<vps_max_layers_minus1;i++) | |
| profile_tier_level(1,vps_max_sub_layers_minus1) | |
| for(i=0;i<vps_max_layers_minus1;i++) { | |
| //layer dependency | |
| num_direct_ref_layers[i] | u(6) |
| for(j=0; j<num_direct_ref_layers[i];j++) | |
| ref_layer_id[i][j] | u(6) |
| } | |
| } | |

The semantics description for the added new syntax is the same avc_base_codec_flag as follow:

| avc_base_codec_flag/source_mixed_codec_flag | Mixed video coding-type |
|---|---|
| 0 | HEVC |
| 1 | AVC |

Option 3

| vps_extension( ) { | Descriptor |
|---|---|
| avc_base_codec_flag | u(1) |
| mixed_video_present_flag | u(1) |
| if (mixed_video_present_flag) | |
| source_mixed_video_type | u(4) |
| scalability_mask | u(16) |
| for(i=0;i<NumScalabilityTypes;i++) { | |
| dimension_id_len_minus1[i] | u(3) |
| } | |
| vps_nuh_layer_id_present_flag | u(1) |
| //layer specific information | |
| for (i=0; i<=vps_max_layers_minus1; i++) { | |
| //mapping of layer ID to scalability dimension IDs | |
| if (vps_nuh_layer_id_present_flag) | |
| layer_id_in_nuh[i] | u(6) |
| for (j=0; j<=NumScalabilityTypes; j++) { | |
| v = dimension_id_len_minus1[j]+1 | |
| dimension_id[i][j] | u(v) |
| } | |
| if(mixed_video_present_flag) { | |
| source_mixed_video_idc[i] | u(4) |
| source_mixed_codec_flag[i] | u(1) |
| } | |
| } | |
| for(i=0;i<vps_max_layers_minus1;i++) | |
| profile_tier_level(1,vps_max_sub_layers_minus1) | |
| for(i=0;i<vps_max_layers_minus1;i++) { | |
| //layer dependency | |
| num_direct_ref_layers[i] | u(6) |
| for(j=0; j<num_direct_ref_layers[i];j++) | |
| ref_layer_id[i][j] | u(6) |
| } | |
| } | | mixed_video_present_flag syntax parameter equals 1 indicates presence of mixed video in VPS layers. If 0, no such mixed sequences are present in the layers.

The presence of this flag is able to save some added bits in case of "no mixed video-type."

| source_mixed_video_type | Mixed video combination sources (1st/2nd/3rd . . . ) |
|---|---|
| 0 | Frame/Field |
| 1 | Frame/Frame-Compatible |
| 2 | Field/Frame-Compatible |
| 3 | Frame-Compatible/Stereo-view |
| 4 | Frame/Field/Frame-Compatible |
| 5 | Frame/Frame-Compatible/Stereo-view |
| 6 . . . 15 | Undefined |

Option 4

| vps_extension( ) { | Descriptor |
|---|---|
|   avc_base_codec_flag | u(1) |
|   mixed_video_present_flag | u(1) |
|   scalability_mask | u(16) |
|   for(i=0;i<NumScalabilityTypes;i++) { | |
|     dimension_id_len_minus1[i] | u(3) |
|   } | |
|   vps_nuh_layer_id_present_flag | u(1) |
| //layer specific information | |
|   for (i=0; i<=vps_max_layers_minus1; i++) { | |
|     //mapping of layer ID to scalability dimension IDs | |
|     if (vps_nuh_layer_id_present_flag) | |
|       layer_id_in_nuh[i] | u(6) |
|     for (j=0; j<=NumScalabilityTypes; j++) { | |
|       v = dimension_id_len_minus1[j]+l | |
|       dimension_id[i][j] | u(v) |
|     } | |
|     if(mixed_video_present_flag) { | |
|       source_scan_type_info_idc[i] | u(4) |
|       source_2d_3d_info_idc[i] | u(1) |
|     } | |
|   } | |
|   for(i=0;i<vps_max_layers_minus1;i++) | |
|     profile_tier_level(1,vps_max_sub_layers_minus1) | |
|   for(i=0;i<vps_max_layers_minus1;i++) { | |
|     //layer dependency | |
|     num_direct_ref_layers[i] | u(6) |
|     for(j=0; j<num_direct_ref_layers[i];j++) | |
|       ref_layer_id[i][j] | u(6) |
|   } | |
| } | | mixed_video_present_flag syntax parameter equals 1 indicates presence of mixed video in VPS layers. If 0, no such mixed sequences are present in the layers.

In case of "mixed_video_present_flag=1," two new syntaxes are present for each layer and these two syntax parameters address two specific application examples with mixed video sources:

Frame/Field structured scan-types and Frame for 2D video, and

Frame-packing arrangement (FPA) video for 3D video.

The semantics description for these two new syntaxes are explained in the tables below:

| source_scan_type_info_idc[i] | Video Layer Characteristics |
|---|---|
| 0 | All pictures in layer i have interlaced scan type |
| 1 | All pictures in layer i have progressive scan type |
| 2 | Pictures in layer i have unknown scan type |
| 3 | Pictures in layer i have a mixture of interlaced and progressive scan type |

| source_2d_3d_info_idc[i] | Video Layer Characteristics |
|---|---|
| 0 | All pictures in layer i are 2D frames |
| 1 | All pictures in layer i are packed in frame compatible 3D format or frame packing arrangement (FPA) |
| 2 | Pictures in layer i have unknown FPA |
| 3 | Pictures in layer i have a mixture of frame compatible 3D and 2D frames |

The syntax modifications described herein extend the layer-based properties of VPS to address various emerging applications in the System layers (content editing, splicing, ad-insertion) as well as in the overall decoding path for better communication and system integration purposes.

Figure 1:
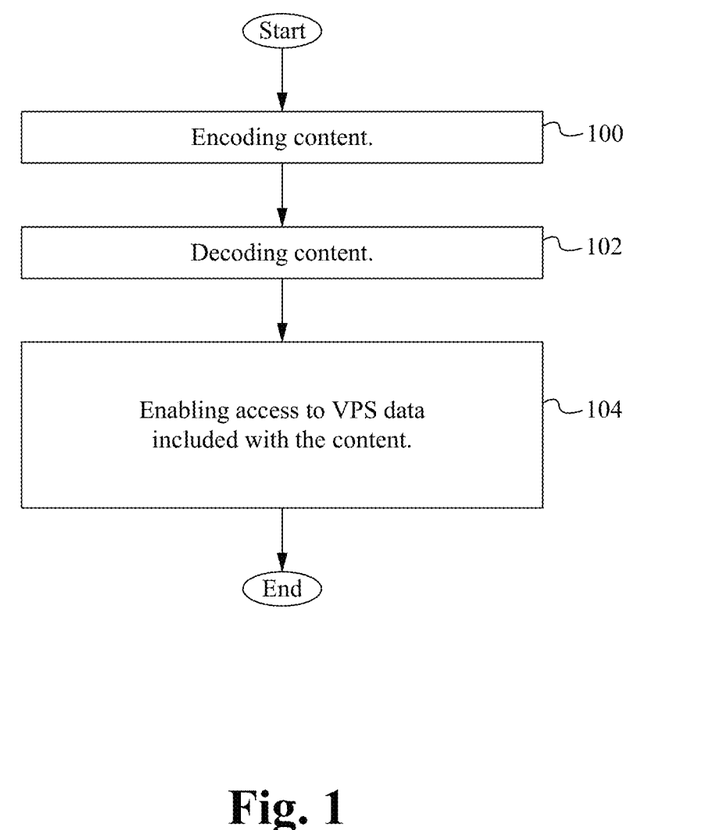
FIG. 1 illustrates a flowchart of a method of utilizing a modified VPS syntax according to some embodiments.

FIG. 1 illustrates a flowchart of a method of utilizing a modified VPS syntax according to some embodiments. In the step 100, content (e.g., a video) is encoded. The VPS data generated using the modified VPS syntax is also included with the encoded content. In the step 102, decoding is implemented. For example, a video is decoded using any decoder. In the step 104, the VPS data is accessible. While decoding the VPS data is able to be used for additional processing. The VPS data contains various HEVC Extension information in scalable video coding, multi-view coding and 3D video coding areas. In some embodiments, the VPS data includes mixed signaling information. In some embodiments, additional or fewer steps are implemented. In some embodiments, the order of the steps is modified.

Figure 2:
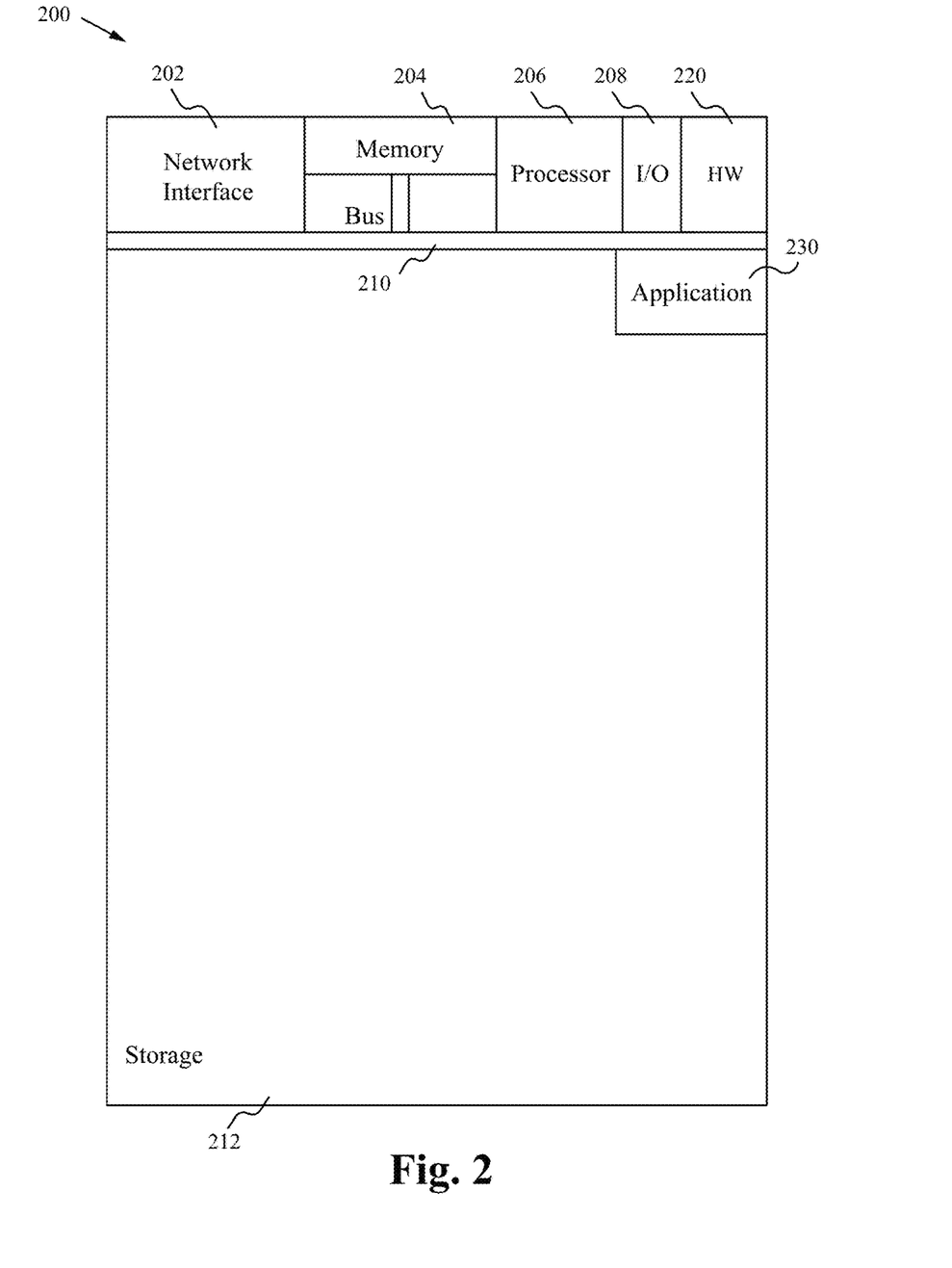
FIG. 2 illustrates a block diagram of an exemplary computing device configured to implement the modified VPS method according to some embodiments.

FIG. 2 illustrates a block diagram of an exemplary computing device configured to implement the modified VPS method according to some embodiments. The computing device 200 is able to be used to acquire, store, compute, process, communicate and/or display information such as images and videos. In general, a hardware structure suitable for implementing the computing device 200 includes a network interface 202, a memory 204, a processor 206, I/O device(s) 208, a bus 210 and a storage device 212. The choice of processor is not critical as long as a suitable processor with sufficient speed is chosen. The memory 204 is able to be any conventional computer memory known in the art. The storage device 212 is able to include a hard drive, CDROM, CDRW, DVD, DVDRW, Blu-ray®, flash memory card or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, screen, printer, modem, touchscreen, button interface and other devices. Modified VPS application(s) 230 used to perform the modified VPS method are likely to be stored in the storage device 212 and memory 204 and processed as applications are typically processed. More or fewer components shown in FIG. 2 are able to be included in the computing device 200. In some embodiments, modified VPS hardware 220 is included. Although the computing device 200 in FIG. 2 includes applications 230 and hardware 220 for the modified VPS method, the modified VPS method is able to be implemented on a computing device in hardware, firmware, software or any combination thereof. For example, in some embodiments, the modified VPS applications 230 are programmed in a memory and executed using a processor. In another example, in some embodiments, the modified VPS hardware 220 is programmed hardware logic including gates specifically designed to implement the modified VPS method.

In some embodiments, the modified VPS application(s) 230 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, smart jewelry (e.g., smart watch) or any other suitable computing device.

Figure 3:
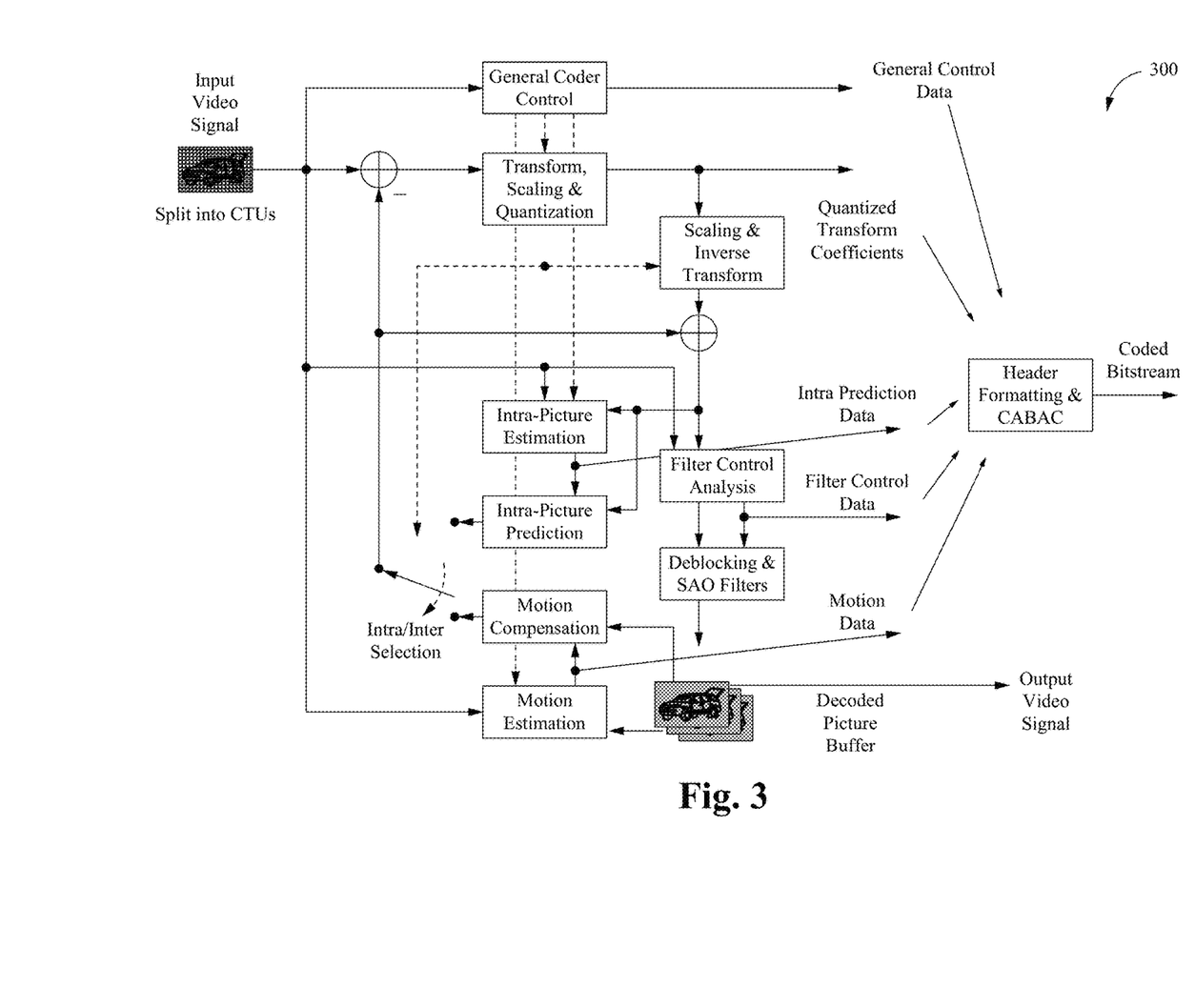
FIG. 3 illustrates a general diagram of an HEVC encoder according to some embodiments.

FIG. 3 illustrates a general diagram of an HEVC encoder according to some embodiments. The encoder 300 includes a general coder control component, a transform scaling and quantization component, a scaling and inverse transform component, an intra-picture estimation component, a filter control analysis component, an intra-picture prediction component, a deblocking and SAO filters component, a motion compensation component, a motion estimation component, and a header formatting and CABAC component. An input video signal is received by the encoder 300 and is split into Coding Tree Units (CTUs). The HEVC encoder components process the video data using the modified VPS and generate a coded bitstream.

Figure 4:
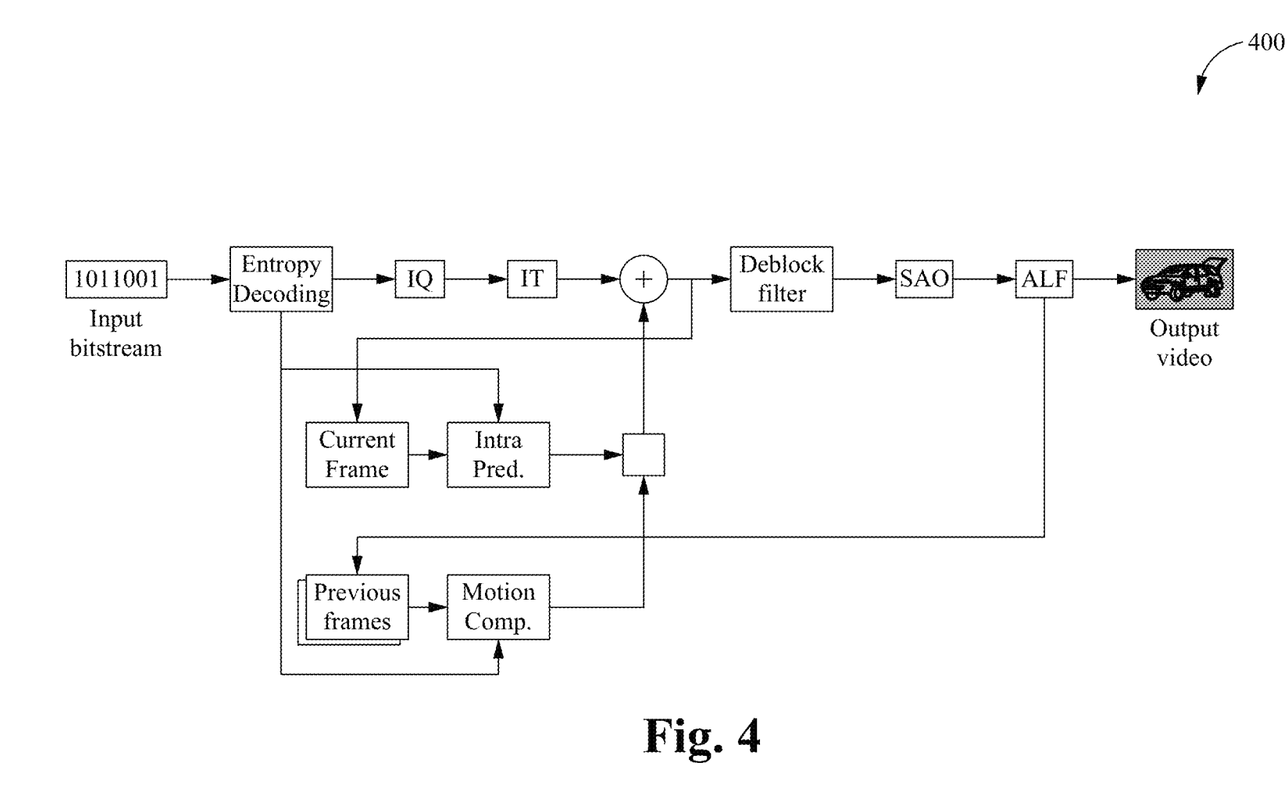
FIG. 4 illustrates a general diagram of an HEVC decoder according to some embodiments.

FIG. 4 illustrates a general diagram of an HEVC decoder according to some embodiments. The decoder 400 includes an entropy decoding component, an inverse quantization component, an inverse transform component, a current frame component, an intra prediction component, a previous frames component, a motion compensation component, a deblocking filter, an SAO component and an adaptive loop filter. An input bitstream (e.g., a coded video) is received by the decoder 400, and a decoded bitstream is generated for display. In some embodiments, the modified VPS is utilized while decoding.

To utilize the modified VPS method, devices are able to access parameters in VPS and its extension for scalable video coding, multi-view coding, 3D video coding and mixed video sequences. The modified VPS method is automatically used when performing video processing or other times. The modified VPS method is able to be implemented automatically without user involvement.

In operation, the VPS and vps_extension( ) syntax structures are updated with some cleanups for the HEVC Extensions in scalable video coding, multi-view coding and 3D video coding areas. In addition, four options of adding syntaxes to support mixed video sequences in various layers for the VPS extension are described. The VPS is generated using the modified syntax structure.

U.S. patent application No. 14/035680, now U.S. Pat. No. 9,992,490, titled "VIDEO PARAMETER SET (VPS) SYNTAX RE-ORDERING FOR EASY ACCESS OF EXTENSION PARAMETERS" and U.S. patent application No. 14/035,740, titled "JCTVC-L0227: VPS_EXTENSION WITH UPDATES OF PROFILE-TIER-LEVEL SYNTAX STRUCTURE" are hereby incorporated by reference in their entireties for all purposes.

Some Embodiments of JCTVC-L0226: VPS and vps_Extension Updates

1. A method programmed in a non-transitory memory of a device comprising:
   1. decoding content; and
   2. accessing information related to the content, wherein the information comprises video parameter set data, further wherein the video parameter set data comprises mixed signaling information.
2. The method of clause 1 wherein a video parameter set function used in determining the video parameter set data is under a condition of a video parameter set extension flag.
3. The method of clause 1 wherein byte-alignment syntaxes used in determining the video parameter set data are under a condition of a video parameter set extension flag.
4. The method of clause 1 wherein the video parameter set data includes a raw byte sequence payload trailing bits value.
5. The method of clause 1 wherein the video parameter set data is determined without using byte alignment syntaxes.
6. The method of clause 1 wherein the video parameter set data is determined using two syntaxes for mixed sequence signaling support.
7. The method of clause 6 wherein the video parameter set data is determined using a source mixed codec flag syntax parameter.
8. The method of clause 7 wherein the video parameter set data is determined using a source mixed video present flag syntax parameter.
9. The method of clause 1 wherein the video parameter set data is determined using specific application support and a source mixed video present flag syntax parameter.
10. The method of clause 1 further comprising encoding the content.
11. The method of clause 1 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a high definition disc writer/player, an ultra high definition disc writer/player), a television, a home entertainment system, or a smart watch.
12. A method programmed in a non-transitory memory of a device comprising:
   1. providing content; and
   2. enabling access of information related to the content, wherein the information comprises video parameter set data, further wherein the video parameter set data comprises mixed signaling information.
13. The method of clause 12 wherein a video parameter set function used in determining the video parameter set data is under a condition of a video parameter set extension flag.
14. The method of clause 12 wherein byte-alignment syntaxes used in determining the video parameter set data are under a condition of a video parameter set extension flag.
15. The method of clause 12 wherein the video parameter set data includes a raw byte sequence payload trailing bits value.
16. The method of clause 12 wherein the video parameter set data is determined without using byte alignment syntaxes.
17. The method of clause 12 wherein the video parameter set data is determined using two syntaxes for mixed sequence signaling support.
18. The method of clause 17 wherein the video parameter set data is determined using a source mixed codec flag syntax parameter.
19. The method of clause 18 wherein the video parameter set data is determined using a source mixed video present flag syntax parameter.
20. The method of clause 12 wherein the video parameter set data is determined using specific application support and a source mixed video present flag syntax parameter.
21. The method of clause 12 further comprising encoding the content.
22. The method of clause 12 wherein the device comprises a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player, a high definition disc writer/player, an ultra high definition disc writer/player), a television, a home entertainment system, or a smart watch.

23. An apparatus comprising:
   1. a non-transitory memory for storing an application, the application for:
      1. decoding content; and
      2. accessing information related to the content, wherein the information comprises video parameter set data, further wherein the video parameter set data comprises mixed signaling information; and
   2. a processing component coupled to the memory, the processing component configured for processing the application.
24. The apparatus of clause 23 wherein a video parameter set function used in determining the video parameter set data is under a condition of a video parameter set extension flag.
25. The apparatus of clause 23 wherein byte-alignment syntaxes used in determining the video parameter set data are under a condition of a video parameter set extension flag.
26. The apparatus of clause 23 wherein the video parameter set data includes a raw byte sequence payload trailing bits value.
27. The apparatus of clause 23 wherein the video parameter set data is determined without using byte alignment syntaxes.
28. The apparatus of clause 23 wherein the video parameter set data is determined using two syntaxes for mixed sequence signaling support.
29. The apparatus of clause 28 wherein the video parameter set data is determined using a source mixed codec flag syntax parameter.
30. The apparatus of clause 29 wherein the video parameter set data is determined using a source mixed video present flag syntax parameter.
31. The apparatus of clause 23 wherein the video parameter set data is determined using specific application support and a source mixed video present flag syntax parameter.
32. The apparatus of clause 23 further comprising encoding the content.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method, comprising:
   in a device configured to receive a bit stream of a video:
      decoding, by a decoder, the bit stream based on a video parameter set (VPS) syntax structure, wherein a byte-alignment syntax is under a condition of a VPS extension flag in the VPS syntax structure,
      wherein the byte-alignment syntax is associated with a byte-alignment;
      determining a value of the VPS extension flag;
      executing the byte-alignment based on the value of the VPS extension flag that is equal to one; and
      executing a VPS extension function based on the byte-alignment.

2. An apparatus, comprising:
   a memory configured to store a video parameter set (VPS) application configured to decode a bit stream; and
   a processor configured to execute the VPS application to:
      decode the bit stream based on a VPS syntax structure, wherein a byte-alignment syntax is under a condition of a VPS extension flag in the VPS syntax structure,
      wherein the byte-alignment syntax is associated with a byte-alignment,
      determine a value of the VPS extension flag;
      execute the byte-alignment based on the value of the VPS extension flag that is equal to one; and
      execute a VPS extension function based on the byte-alignment.

3. The method of claim 1,
   wherein a VPS function is under the condition of the VPS extension flag in the VPS syntax structure, and
   wherein the VPS function is used for determining VPS data.

4. The method of claim 1,
   wherein a VPS function is present after the byte-alignment syntax in the VPS syntax structure, and
   wherein the byte-alignment syntax used for determination of VPS data is under the condition of the VPS extension flag.

5. The method of claim 1, further comprising storing, in a storage unit, a VPS application configured to decode the bit stream.

6. The method of claim 1, further comprising generating VPS data based on the VPS syntax structure, wherein the VPS data includes HEVC extension information in one of scalable video coding, multi-view coding or 3D video coding areas.

7. The method of claim 6, wherein the VPS data further includes mixed signaling information.

8. The method of claim 1, wherein the VPS extension function is under the condition of the VPS extension flag in the VPS syntax structure.

* * * * *